US010423610B2

(12) United States Patent
Ollikainen et al.

(10) Patent No.: US 10,423,610 B2
(45) Date of Patent: Sep. 24, 2019

(54) EXCHANGE OF INFORMATION

(75) Inventors: Ville Ollikainen, VTT (FI); Juha-Matti Lehtinen, VTT (FI); Antti Tammela, VTT (FI); Kristiina Kantola, VTT (FI); Raimo Launonen, VTT (FI)

(73) Assignee: TEKNOLOGIAN TUTKIMUSKESKUS, Vtt (FI)

( * ) Notice: Subject to any disclaimer, the term of this patent is extended or adjusted under 35 U.S.C. 154(b) by 342 days.

(21) Appl. No.: 14/001,309

(22) PCT Filed: Feb. 24, 2012

(86) PCT No.: PCT/FI2012/050191
§ 371 (c)(1),
(2), (4) Date: Nov. 13, 2013

(87) PCT Pub. No.: WO2012/113992
PCT Pub. Date: Aug. 30, 2012

(65) Prior Publication Data
US 2014/0059067 A1 Feb. 27, 2014

(30) Foreign Application Priority Data
Feb. 24, 2011 (FI) ...................... 20115184

(51) Int. Cl.
*G06F 17/30* (2006.01)
*G06F 16/24* (2019.01)
(Continued)

(52) U.S. Cl.
CPC ............ *G06F 16/24* (2019.01); *H04L 67/306* (2013.01); *H04W 4/80* (2018.02); *H04W 92/18* (2013.01)

(58) Field of Classification Search
CPC ....................................................... G06F 17/24
(Continued)

(56) References Cited

U.S. PATENT DOCUMENTS 7,434,252 B2 * 10/2008 Ballinger .............. G06F 21/335
713/172
8,230,231 B2 * 7/2012 Freeman ................. G06F 21/31
380/44

(Continued)

OTHER PUBLICATIONS

Shahabi et al., "An Adaptive Recommendation System without Explicit Acquisition of User Relevance Feedback", Distributed and Parallel Databases, 2003, vol. 14, pp. 173-192.

(Continued)

*Primary Examiner* — Jean M Corrielus
(74) *Attorney, Agent, or Firm* — Young & Thompson

(57) ABSTRACT

The invention relates to a method for exchange of information between a computing unit of a first entity and a computing unit of at least one second entity. A computing unit of at least one second entity is detected and information on a token associated to the second entity from the computing unit is requested and received. On the basis of the received information, the token associated to the at least one second entity, is retrieved and a token associated to the first entity is modified at least partly with information of the received token associated to the at least one second entity. Finally, the modified token is utilized at least in the service the computing unit of the first entity belongs to. The invention relates also to a system and a computing unit implementing the method.

13 Claims, 3 Drawing Sheets

(51) Int. Cl.
*H04L 29/08* (2006.01)
*H04W 92/18* (2009.01)
*H04W 4/80* (2018.01)

(58) Field of Classification Search
USPC .......................................................... 707/758
See application file for complete search history.

(56) References Cited

U.S. PATENT DOCUMENTS

| | | | | |
|---|---|---|---|---|
| 8,447,983 | B1* | 5/2013 | Beck | H04L 9/0894 |
| | | | | 705/65 |
| 8,682,918 | B2* | 3/2014 | Ramanujam | G06F 17/30867 |
| | | | | 707/737 |
| 9,123,022 | B2* | 9/2015 | Skarin | G06Q 10/10 |
| 9,633,224 | B1* | 4/2017 | Dutta | G06F 21/602 |
| 2005/0289082 | A1* | 12/2005 | Morris | G06Q 20/367 |
| | | | | 705/65 |
| 2006/0015933 | A1* | 1/2006 | Ballinger | G06F 21/335 |
| | | | | 726/10 |
| 2007/0005695 | A1 | 1/2007 | Chen et al. | |
| 2008/0294621 | A1* | 11/2008 | Kanigsberg | G06F 17/30867 |
| 2009/0012817 | A1* | 1/2009 | Squires | G06F 19/322 |
| | | | | 705/3 |
| 2009/0228211 | A1 | 9/2009 | Rasanen et al. | |
| 2009/0271847 | A1* | 10/2009 | Karjala | H04L 63/0807 |
| | | | | 726/6 |
| 2010/0262834 | A1* | 10/2010 | Freeman | G06F 21/31 |
| | | | | 713/184 |
| 2011/0010366 | A1* | 1/2011 | Varshaysky | G06F 17/30864 |
| | | | | 707/732 |
| 2011/0238608 | A1* | 9/2011 | Sathish | G06Q 30/02 |
| | | | | 706/47 |
| 2011/0276693 | A1* | 11/2011 | Jensen-Home | G06F 9/5061 |
| | | | | 709/226 |
| 2012/0233191 | A1* | 9/2012 | Ramanujam | G06F 17/30867 |
| | | | | 707/758 |
| 2013/0097715 | A1* | 4/2013 | Fourman | G06F 17/30867 |
| | | | | 726/26 |
| 2013/0159331 | A1* | 6/2013 | Zhang | G06F 17/30241 |
| | | | | 707/758 |
| 2014/0180868 | A1* | 6/2014 | Kanigsberg | G06F 17/30867 |
| | | | | 705/26.7 |
| 2015/0324592 | A1* | 11/2015 | Dutta | G06F 21/602 |
| | | | | 713/165 |
| 2017/0185801 | A1* | 6/2017 | Dutta | G06F 21/602 |

OTHER PUBLICATIONS

Kim et al., "A Recommender System Using GA K-means Clustering in an Online Shopping Market", Expert Systems with Applications, 2007, pp. 1-10.

Finland Search Report, dated Dec. 20, 2011, from corresponding FI application.

* cited by examiner

EXCHANGE OF INFORMATION

TECHNICAL FIELD

The invention concerns in general the technical field of communication of different entities. Especially the invention concerns exchange of information between computing units of different entities.

BACKGROUND OF THE INVENTION

A concept of ubiquitous computing means that multiple types of networked computing units are involved in everyday life and by communicating with each other enable highly sophisticated ways to improve life in general. The interaction between different types of computing units and/or objects enable not only ubiquitous services for their users, but also give some novel opportunities for systems which are learning from user behavior. Such an opportunity may be used for e.g. so called recommendation systems based on collaborative filtering in which a user receives such information for his/her decision making which is affected by other users' previous experiences.

In order to enabling the exchange of information between computing units and/or objects of the ubiquitous computing systems there is a need to be set up information elements which can be utilized in information exchange. The same in-formation elements can be used for providing highly sophisticated services so that advantages of ubiquitous computing can be seen by the users.

Let's have a look to traditional recommendation systems. The recommendation systems are based into filtering of information based on a predetermined criteria derived from preferences or history of a user or any other entity. Many times the recommendation systems are considered to have a social element involved in the operation due to the fact that collaboration in general is a key issue in the systems. In these systems there are three major challenges: Firstly, user preferences are not necessarily known even to the user himself. Secondly, preferences are seldom commensurate in different domains, e.g. defining preferences for movies may have nothing to do with preferences for travelling. Thirdly, providing any personal information such as preferences to any service potentially threatens individual privacy. Collecting history data threatens privacy even more severely. These are the challenges the presented invention is addressing.

An example of a utilization area of the recommendation systems can e.g. be services provided for mobile computing units. This is due to the fact that since the mobile computing units move around, it is also advantageous from user's point of view to receive recommendations relating to a context of the computing unit. Thus, one can say that recommendations have become essential in creating additional value for mobile service providers. Contexts play a focal role in understanding what the users of a mobile service want or need. Thus, understanding user's context and acting based upon it is of the utmost importance for a mobile service to be successful. On a more general approach, it can be said that there are numerous computational problems, the purpose of which is to predict the behavior of an entity, and for these problems several mathematical methods combined with the recommendation systems are superior. The mathematical methods need also to be used for understanding the context of a user and thus making better and better recommendations thereof.

As already referred above in order to provide recommendation systems it requires exchange of information between the entities. A prior art document US2009228211A1 discloses a recommendation system in which information on user's context, such as daily routines, is collected and by analyzing this history information, with e.g. position information, it is possible to deliver, by the service providers such as shops, recommendations to the user in an intelligent way. Information on the user's context is maintained in a network and context activity is periodically transmitted thereto.

However, the prior art systems do not disclose a solution in such a case in which user preferences are to be exchanged with some other entity and based on that exchange a service is to be provided. Moreover, the prior art solutions do not disclose systems in which several computing units can interact and exchange of information and in response to that determine a value for similarity of the user specific information and on the basis of the similarity value to provide services to a user.

SUMMARY OF THE INVENTION

An objective of the invention is to present a method, a system and a computing unit for exchange of information. Another objective of the invention is that the method, the system and the computing unit for exchange of information results a sophisticated information token to be utilized in at least one service.

The objects of the invention are reached by a method, an apparatus and a computer program as defined by the respective independent claims.

According to a first aspect, a method for exchange of information between a computing unit of a first entity and a computing unit of at least one second entity is provided, wherein the computing unit of the first entity is configured to detect events within a service the computing unit of the first entity belongs to. The method comprises steps of detecting the computing unit of the at least one second entity, requesting information on a token associated to the at least one second entity from the computing unit of the at least one second entity, receiving information on the token from the computing unit of the at least one second entity, retrieving on the basis of the received information the token associated to the at least one second entity, modifying a token associated to the first entity at least partly with information of the received token associated to the at least one second entity, and utilizing the modified token at least in the service the computing unit of the first entity belongs to.

The method may further comprise a step of storing at least the modification of the token associated to the first entity. The storing may comprise at least one of the following: replacement of the modified values of the token, replacement of the token with the modified token, creation of a new token, creation of a new token to an existing token structure.

According to the method the utilization of the modified token may comprise a step of determining at least one measure of similarity between the modified token associated to the first entity and one or more tokens associated to at least one second entity belonging to the service. Furthermore, on the basis of the measure of similarity information to be output in the computing unit of the first entity may be selected. A correlation is determined as a measure of similarity, for example. The step of utilization of the modified token may further comprise a further step of selecting one measure of similarity among multiple determined measures of similarity.

Moreover, the method may further comprise a step of retrieving the token associated to the first entity from a data storage. The retrieval of the token may be initiated in response to at least one of the following: access to a service, detection of a computing unit of at least one second entity belonging to the service, initiation of communication between the computing unit of the first entity and the computing unit of at least one second entity.

The information on the token associated to the second entity may comprise a reference, either directly or through a further entity, to the token. The reference may be a network address.

According to a second aspect, a system comprising a computing unit of a first entity and a computing unit of at least one second entity is provided wherein the first and second computing units are configured to exchange of information, and the computing unit of the first entity is configured to detect events within a service the computing unit of the first entity belongs to. In the system the computing unit of the at least one second entity is configured to be detected, information on a token associated to the at least one second entity from the computing unit of the at least one second entity is configured to be requested, information on the token from the computing unit of the at least one second entity is configured to be received, the token associated to the at least one second entity is configured to be retrieved on the basis of the received information, a token associated to the first entity at least partly with information of the received token associated to the at least one second entity is configured to be modified, and the modified token is configured to be utilized at least in the service the computing unit of the first entity belongs to.

According to a third aspect, a computing unit for exchanging information with at least one other computing unit of at least one second entity is provided wherein the computing unit comprises communication means for exchanging information with at least one other computing unit, memory unit for storing portions of computer code containing instructions to be executed by a processing unit and the processing unit. The processing unit is configured to detect the computing unit of the at least one second entity, request information on a token associated to the at least one second entity from the computing unit of the at least one second entity, receive information on the token from the computing unit of the at least one second entity, retrieve on the basis of the received information the token associated to the at least one second entity, modify a token associated to the first entity at least partly with information of the received token associated to the at least one second entity, and utilizing the modified token at least in the service the computing unit of the first entity belongs to.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Figure 1:
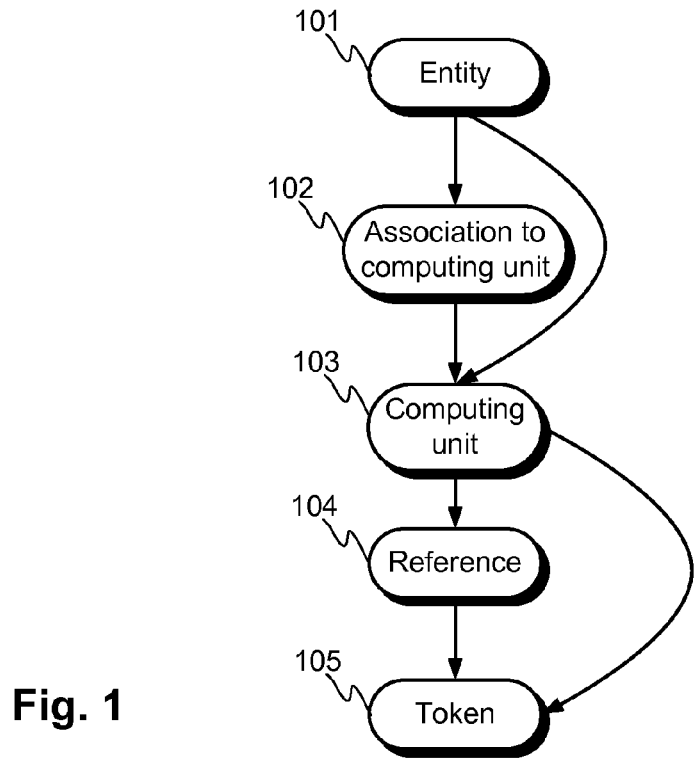
FIG. 1 illustrates a hierarchical structure of the elements of the invention.

The development of technology is enabling all the time more complex information exchange between different computing units and/or systems communicating with each other over one or more communication network. The exchange of data is arranged between user devices and/or systems, which are equipped so that they are capable of communicating with each other. The communication can be arranged either directly or indirectly through any network and/or network element. In this document the information is exchanged in a form of token, described later in detail.

When describing the invention, it is advantageous to define a term 'entity'. An entity can, for instance, be a user, a user terminal, a location, a media object and so forth. More precisely, the entity comprises technical means for communicating, or at least initiating the communication with another entity comprising another technical means for communication. A related concept of entities can be found from ucode (universal ID) paradigm, in which a unique identification number is assigned to individual objects and places, either existing or not existing in real world. In fact, anything which can be assigned to an individual ucode can be an entity in the scope of this document.

The invention is aiming at providing a measurement, how different entities are related from user perspective. The relationship between two entities is measured by calculating a certain similarity between them. These measurements are derived from relatively small pieces of data, tokens, which are exchanged between computing units and modified thereafter mainly according to user behavior. As a result the tokens form a self-organizing system with similarities enabling for example anonymous recommendations for users.

The core of the invention is a method and apparatus to measure similarities or differences between entities within a service according to a chosen metric. As a tool for the measurement, there are tokens associated with each entity, accessed either directly or indirectly by computing units associated with the entities. The form of the token can be a vector, for example, comprising one or more numeric values, but in general it can be anything which may be presented as a set of data which is subject to modifications. In principle the size of the token is not restricted. An example of the token is a vector with 64 floating point values. Similarly, any other form, such as matrix, can be used for representing the values in tokens. Advantageously the form is such that it is possible to define and point part of the data structure i.e. values if needed. Obviously, implementations may pose a limit for token size, for instance because of limited amount of available memory.

In the following the invention is described from a perspective of one computing unit, for instance a user terminal, belonging to the service. When the computing unit is joining the service, a token comprising advantageously random data is created. The token can be stored in the computing unit or alternatively in a storage residing in the network, such as in a memory of an applicable network element. If the token is stored in a network, the computing unit is configured to store reference information, such as a network address, from where the token can be found and/or retrieved. Independently of the location of the token, the token can be called and retrieved by an application residing in the computing unit and/or by a network element residing in a network. The token thus comprises data associated with the computing unit, the data to be used in the service. Since the computing unit is associated with an entity, the data is also associated with the entity. If it happens that the computing unit is by no means associated with any entity, we can say that the computing unit is an entity itself for the moment. Generally speaking, the token is dynamic in nature, meaning that at least one value of a token can be modified, but also, if applicable, the form, such as the size, of the token can be changed.

It is possible that the user who owns the computing unit may own other entities, such as other computing units which can join the service as well. In this case it is advantageous if the token resides in the network and can be accessed by any computing unit associated with the subsequent entities belonging to an individual user: Instead of creating new tokens for these computing units, it is advantageous to configure them to store same reference information, where the token can be found and/or retrieved. In other words it is advantageous, if all entities belonging to the individual user would share the same token. This token can be then referred as the token belonging to the user rather than belonging to any computing unit owned by the user: thus the entity with which the token is associated is the user himself.

It is also possible to create and/or associate more than one token for an entity comprising communicating means with the technical means of at least one other entity. This is especially advantageous if the entity has different contexts, e.g. for a user travelling in different locations or performing different activities, such as driving, working or jogging. If an entity is a restaurant, for instance, it may have a context of a breakfast place in the morning, a lunch restaurant by noon, a cafeteria in the afternoon and a bar in the evening. Thus, it is convenient to create multiple tokens for the mentioned context. If there are multiple tokens defined for an entity, it is feasible to store them in any hierarchical order to one or more data storages.

Keeping the same exemplary perspective of a computing unit, it is now possible for the computing unit to retrieve a token from a storage. The retrieval of the token can be triggered to an initiation of a use of a service. Alternatively or in addition, the retrieval of a token can be initiated from a predetermined action in the computing unit, or a sign-in process based on user credentials, for example. Further, the retrieval of the token can be initiated by the user. More examples of triggering events are presented later in this document.

FIG. 1 illustrates an example of the hierarchical structure of the elements referred in the description herein. In response to an interaction of entities 101 the computing unit of the first entity is configured to either directly communicate with the computing unit 103 of the second entity or detect an association to the computing unit 103 of the second entity. The associate can be e.g. QR code, which comprises the information on the computing unit 103 of the second entity from where it is possible to find a reference 104 to data storage from where a token 105 specific to the second entity can be found. Alternatively or in addition, the computing unit 13 of the second entity may directly have access to the token 105, requested in the communication. The association to a computing unit 103 may also comprise more than one layers. For example, the association information can be an ucode comprising an address to the ucode database. The ucode database may comprise a reference, such as URL, to a server, which finally manages and controls tokens associated to that ucode. The server is in this case the computing unit associated with the entity. It is straightforward, that the number of layers may vary a lot under the inventive idea as disclosed here.

Figure 2:
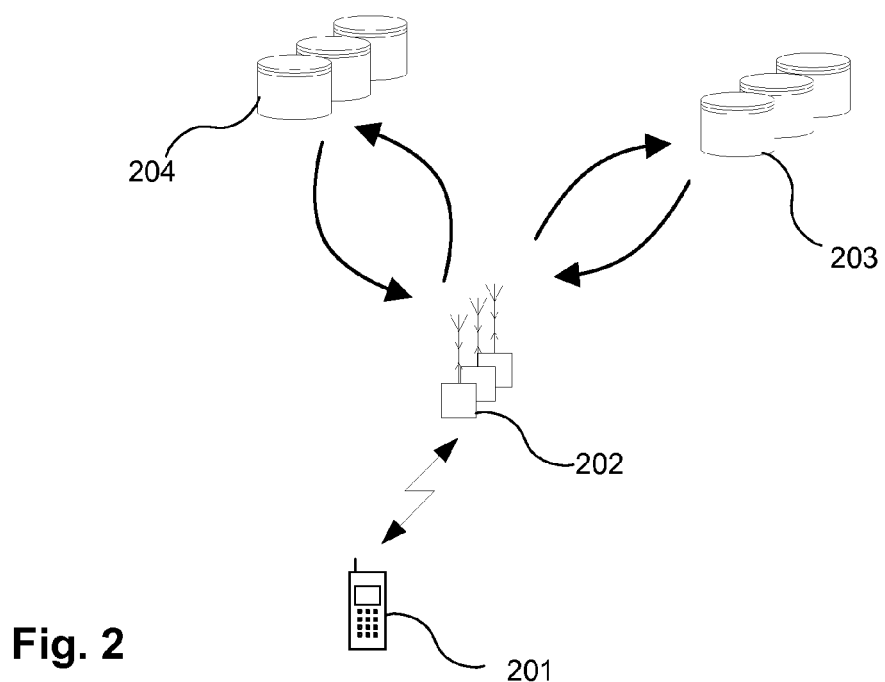
FIG. 2 illustrates an embodiment of the invention.

In some cases the retrieval of the own token can be an indirect process as depicted in FIG. 2. Namely, it is possible that a computing unit of an entity is identified in some manner. When it comes to computing units 201, the identification can be based, for example, on a computing unit ID, such as MAC (Media Access Control) address, by means of which it is possible to find and access, over a network 202, to a database 203 containing computing unit 201 related information, including reference information to the token, or even the token itself. The reference information stored in the database 203 may comprise a network address, such as URL (Universal Resource Locator), to another data storage 204 from where it is possible to find a token for the entity using the computing unit 201. In order to retrieve a correct token the token retrieval request may comprise an identifier for a token to be retrieved or the correct token is selected according to predetermined criterion which is checked before or during the retrieval. When it comes to locations, for instance, the information on the network address and the token identifier, if applied, can be composed to an optical QR code or NFC (near field communication) tag which is accessed by the requesting entity for interpretation and use. For indirect referencing, the database 203 may alternatively comprise so called ucode associated with the entity. By means of the content within the ucode it is possible point to a specific network address (ucode database) from where it is possible to find the final network address in order to find the token. As mentioned, the ucode database may also provide reference to the computing unit associated to the entity specific to the ucode. Whenever an entity owns a plurality of computing units, the ucode database may advantageously provide a reference to at least one computing unit and at least one token associated to the entity.

The same retrieval mechanism as disclosed in FIG. 2 for retrieving the own token can also be applied to retrieving a token of the other entity. This requires that the computing unit of the first entity is aware an reference from where, either directly or indirectly, the token of the second entity can be retrieved. This issue is also discussed in the context of FIG. 1.

Figure 3:
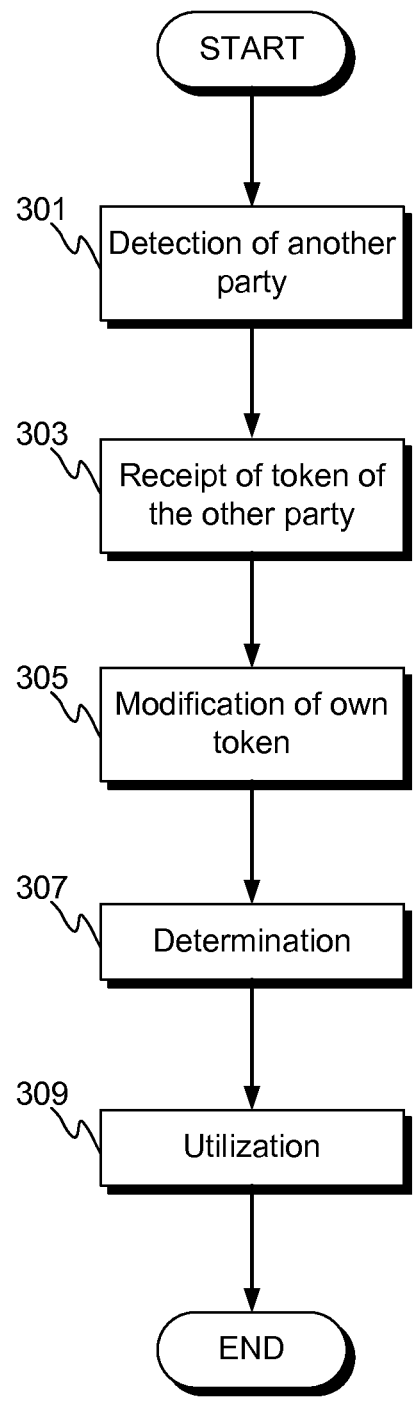
FIG. 3 illustrates a method according to an embodiment of the invention.

FIG. 3 illustrates a flow chart of the method according to the invention. According to an invention the computing unit is configured to detect 301 if any other entity is belonging to the service. The other entity can be any entity which can be detected and which is itself or has a computing unit capable of exchanging information, such as another computing unit or a computing system, for example. In response to the detection of another entity, the computing unit is configured to receive 303, either automatically or on request, another token associated with the other entity belonging to the service. The receipt of another entity token may require exchange of information from and to the computing unit in question, such as signaling and/or exchange of information towards network as discussed in the context of FIG. 1. The exchange of information can be performed either wirelessly or by wired means either directly between the entities of the communication or indirectly, for instance over a network element, a network. Alternatively or in addition, the computing unit may retrieve a token associated with the user of the terminal and deliver it to the other entity.

According to a further embodiment a third entity may be involved in the interaction between the entities. For example, a base station may be capable of detecting computing units arriving and departing the area served by the base station. The base station may, for example, detect the computing units in proximity by means of short range communication technologies, such as Bluetooth. Typically, the easiest way to detect computing units within the area is when the Bluetooth communication is also activated in the computing unit, but in some cases it is also possible to detect the computing unit by means of Bluetooth even if the Bluetooth communication is not explicitly set active in the computing unit. The detection of computing units advantageously means that it is possible to identify the computing unit in question from the other terminals. More specifically, the base station is often capable of deriving an identifier, such as MAC address, from any computing unit it is serving. By means of the identifier the base station is capable of retrieving, either directly or indirectly, tokens associated with the entities through computing units from either a storage residing in the computing unit or from a network if applicable. Now, when the base station has received tokens to the computing units it is serving, the base station is configured to perform the interaction i.e. exchange of token information according to a predetermined instruction stored in the memory of the base station and executed by a processing unit within the base station when at least portion of computer code containing the instruction is executed by the processing unit of the base station. Similarly, the third entity can be any other computing unit of an entity than a base station. For example, a service provider may retrieve the tokens for each of the user of the computing units, who are belonging to the service. The service provider may, by means of computing units, exchange and modify information in the tokens so that the users of the provided service may get added value from them. In one variation of this embodiment a third entity may, after detecting a plurality of entities in its proximity send a triggering messages to at least one of the computing units or other entities in proximity. In this case at least one of the triggering messages would advantageously contain reference information to at least one of the other entities in the proximity. In this variation the triggering messages may also be delayed, informing entities of other entities having recently being within the same area.

As already referred with respect to steps 301 and 303 in FIG. 3, a computing unit may comprise a token and also another token belonging to another entity associated with the service with which the computing unit belongs to. The computing unit and/or any third entity may have received the token belonging to another entity as discussed with respect to FIG. 1, steps 101 and 103 above. In the next step the computing unit is configured, by executing portions of computer code stored in a memory of the computing unit, to modify 105 the token belonging to the user at least partly with the information of the received token associated with the other entity. The modification 305 comprises at least the following functions, alone or in combination: comparison, replacement, calculation. The comparison means that two corresponding values are compared to each other in order to get an indication of a desired parameter, such as value in a similarity metric. Similarity metric may in turn be for instance Euclidean distance, at least whenever tokens can be represented as vectors, or Pearson's correlation. Replacement means that one or more values are replaced with one or more other corresponding values originating either from the other token or anywhere else. The calculation means that some mathematical operation is performed to one or more values in the token, which mathematical operation takes into account, at least partly, the corresponding value in at least one other token. One type of calculation is to represent the token as a point in selected mathematical space. Another is to calculate distance between two points in the same mathematical space. For example, statistical mathematical operations can be utilized. In response to any of the mentioned modifications the token can be updated on the basis of the outcome of the modification and/or a new token can be created. The modified token can be stored in the storage replacing the original token if desired. Alternatively or in addition, the new token can be added to the storage as a new entry.

Figure 4:
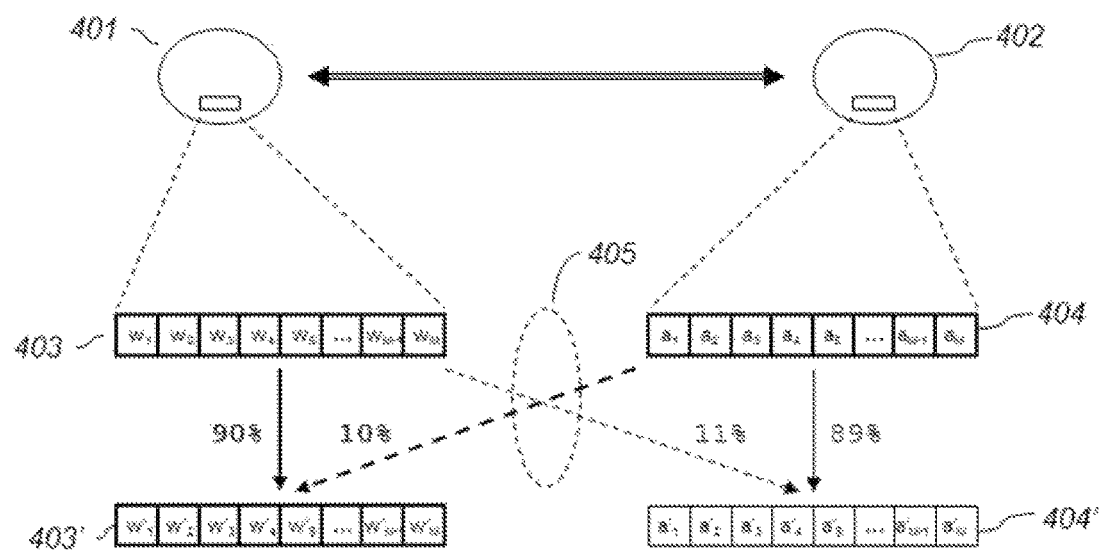
FIG. 4 illustrates a way of exchanging information according to an embodiment of the invention.

Next, a possible way to modify at least one token is described as an example by referring to FIG. 4. The modification of tokens is performed between two computing units 401, 402. The tokens 403, 404 are associated with each interacting units i.e. entities through computing units 401, 402 and the tokens 403, 404 are updated as a result of the interaction. The update of one token 403, 404 is based on information exchange 405 from another token 403, 404 associated with the other computing unit 401, 402. In the example as depicted in FIG. 4 the tokens are influenced in a linear manner by a percentage of influence, advantageously not greater than 50%, by the other interacting token. The remaining proportion, thus not less than 50%, originates from the existing values of the token itself. This is basically multiplying the tokens by scalar values (percentages) and adding up the results. Respectively, the same procedure is carried out for the other token being involved in the interaction. As a result the modified tokens are more similar to each other using the chosen similarity metric than they previously were.

In some applications the storing of a token is dependent on the amount of modification performed to a token. For example, the token after been modified with at least one other token associated with another entity is compared with the original token. If a certain predetermined level on the amount of modification is not detected in the comparison, the modified token would replace the original token, Otherwise the modified token would be stored as a new entry. Alternatively or in addition, the modified token may be compared against at least one of the other tokens associated to the entity by means of the computing unit, and all tokes with which a predetermined level of difference has not been detected would become deleted. The amount of modification can also be estimated before modification by measuring difference between the token and at least one other token involved in the modification. These are examples of arrangements which enable a sophisticated mechanism to limit the storage of tokens according to predetermined criteria.

Also, when more than two entities, by means of computing units, are involved in an interaction, the interaction can be advantageously divided into individual interactions between each pair of interacting entities. The computing units associated with these entities are capable of communicating and exchanging information with each other. Another approach could be creating a temporary token which is advantageously an average other interacting tokens, and use the temporary token in the data exchange.

From privacy point of view, some entities, and thus their tokens, may be defined "private" whereas the rest might be referred as "public". Typically, a public entity would be an entity in public space whereas private entities would belong to an individual user. Whenever it comes to a private entity, it is advantageous to never disclose any history of an individual in any interaction. Tokens fulfill this requirement, because there does advantageously not have to be any direct mapping between the values in the token and interactions in the past. Alternatively or in addition, in the case of a user being associated with more than one token, it can be defined so that the publicity of tokens is set according to a context. For example, a token can be public e.g. in some location, but private in some other location. Such an arrangement enables the exchange of information in a specific token between trusted entities only, e.g. only with computing units which are visiting a predetermined home area of a specific computing unit. Naturally, such an arrangement requires means for detecting the context where the user is in and/or any other entity monitoring the operation of the computing unit. Additionally, the home area needs to be defined in order to enable the exchange of data as described by comparing the location of the computing unit to the home area and additionally the detection of at least one other entity, such as another computing unit, within the home area.

In case when one entity has more than one token, a hierarchical data structure can be created. For example, each of the tokens associated with the entity are stored in a tree structure, preferably in such a manner that each of them can be retrieved separately.

According to one aspect of the invention, as already mention, instead of updating the token stored with a modified token, a new token is created which advantageously resembles more the unmodified token than the token, which was at least partly used in the modification. The original, or in other words unmodified, token can also be called as a parent token and the modified token can be called as a child token. When implementing a structure comprising the tokens associated with the entity, it is advantageous to maintain the relationship of the parent token(s) and child tokens(s) in the structure, leading advantageously to a well known tree data structure. As a result, it is possible to detect the creation path of one single token, also enabling common operations like searching by walking the tree, pruning (such as deleting tokens with excessive similarity, as described earlier) and crafting (such as associating new computing units with previous tokens with the same entity).

Whenever more than one token is associated to an entity, it is advantageously possible to search the most appropriate token for interaction with some other token of another computing unit from the data structure where the tokens are stored. For example, if a token is received from another computing unit, it can be compared with at least some of the tokens stored in the data structure. The goal in comparison can be to find the token with highest similarity with the one received from another entity. The advantage of such a search is that the interaction, i.e. the exchange of values in the token, can be achieved effectively i.e. only minimum number of tokens is exchanged. The effectiveness comes from e.g. the resource requirements in the communication between the terminals. In a tree structure the search can be implemented efficiently by traversing from the root token, comparing each time the token in question and its children with the token received from another entity and proceeding to the children which has highest similarity. The search can advantageously stop to a token, the result of the search, when the token in question has higher similarity or has no children.

It may be advantageous to associate a value for each token indicating how many times it has been updated. Further advantages may be obtained if timestamps of creation, last access and/or last update are associated with the data set. These values can be used in other applications of the invention. The association of usage information of the token is not dependent on the data structure in which the token(s) is stored.

Another approach to the utilization of the token for user needs is that a token associated with a user, and further accessed by for instance a computing unit, is compared with a second token associated to another entity. In response to the comparison a value of similarity measure, such as correlation, between the tokens can be determined as depicted in FIG. 3, step 307. Naturally, in order to compare the tokens, values in the tokens shall be comparable i.e. they can be presented in the same mathematical space. The definition of similarity enables a creation of a recommendation system, in which the highest similarity values (e.g. smallest Euclidean distance) and respective entities are taken into account, when selecting output data to the user of the computing unit. Moreover, it is possible to determine a value for similarity between the modified token and any other token associated to another entity. When a value for similarity is determined, that information can be utilized, step 309 in FIG. 3, in at least some services, such as in recommendation systems.

Some Further Aspects of Applying the Invention in the Recommendation Systems

Having a plurality of tokens associated to an entity is also related to recommendation methodology. When a computing unit for which a recommendation should be generated is associated with plurality of tokens, which one of the tokens to use as the primary token? In a trusted environment the best results may be expected if a recommendation would be searched for each one of the tokens associated with the entity and the recommendation results would be combined using a method selected by a person skilled in the art. The trusted environment could be such an arrangement, in which all tokens are stored in a single data base.

In environments which are not trusted, disclosing more information, more tokens that is, than necessary would be adverse from the point of view of the above mentioned privacy objective. As already discussed, different tokens may be related to different contexts the entity is in. Thus, whenever the context is explicitly known, the related token can be used as the primary token. Even if the context is not explicitly known, the last token, for instance deducted from timestamps, may be used as the primary token, since it can be assumed to be related to most recent context, or, whenever receiving a token from another entity, the tokens in the data structure can be searched for highest similarity, for instance as described earlier as a search for the most appropriate token for interaction. In the latter case it is likely that the most appropriate token would be the token for the context anyway.

Also the most frequently used token, for instance according to a value indicating how many times it has been updated, could be an appropriate basis for selection. In some cases also a temporary token may be generated as a weighted average from a plurality of tokens associated with the entity, and to use this temporary token as the primary token for a recommendation.

Furthermore, also the recommendations may be based on traversing through several tokens in the data structure, especially using a tree structure: it would be feasible to begin the search using the token in the root node as the primary token and continue search by using each child as the primary token. If a child produces better recommendations for instance in terms of greatest similarity of the best match the search could advantageously continue to the children of that child. When a child cannot provide better recommendations, the search process can finish advantageously with the latest results as final recommendations.

According to some embodiment of the invention it is possible to define that a token has an expiration time. This can be arranged e.g. by means of a timestamp, such as timestamp of creation, last access and/or last update, which is associated with the token. Based on the timestamp it is possible to arrange a cleaning up the system from obsolete tokens if too much time has passed since creation, last access and/or last update. The cleanup strategy and implementation has to be carried out on case by case. The cleaning can be initiated by the computing unit according to predefined schedule or by the computing means controlling the storage of tokens.

In the following it is listed, as examples of events, how another entity is detected:
From Bluetooth proximity, as described
From Wi-Fi proximity, respectively
Location basis
User entering an optical (e.g. QR) code to the computing unit
Near Field Communication (NFC)
When accessing another code (e.g. ucode) database In the above description it is mainly referred to a computing unit which is involved in the interaction and thus involved in an exchange of at least one value in the token with another entity. However, the computing unit can be any device, which is capable of communicating with at least one other computing unit entity and exchange of information with said at least one other computing unit. For example, such a computing unit can be a mobile terminal, computer, server, server of a service provider, a tag accessible with e.g. radio communication or any similar.

In general, the computing unit comprises at least communication means for exchanging information with at least one other computing unit. The communication means may comprises modems and interfaces to implement wireless communications technologies, such as Bluetooth, WLAN, GSM, 3G and/or LTE in such a manner that the computing unit may communicate with at least one other computing unit. Additionally, the computing unit comprises memory unit, such as ROM and/or RAM for storing portions of computer code containing instructions to be executed by a processing unit. The portions of computer code contain at least instructions to implement at least the method steps of the invention as described. Moreover, the memory unit may be configured to store one or more tokens either permanently or temporarily. The computing unit also comprises a processing unit for executing the computer code stored in the memory unit in order to achieve the computing unit perform as discussed when describing the current invention. At least the processing unit is configured to achieve a detection of a computing unit of at least one second entity; requesting information on a token associated to the at least one second entity from the computing unit of the at least one second entity; receipt of information on the token from the computing unit of the at least one second entity; retrieval, on the basis of the received information, the token associated to the at least one second entity; modification of a token associated to the first entity at least partly with information of the received token associated to the at least one second entity; and utilization of the modified token at least in the service the computing unit of the first entity belongs to.

Some advantageous embodiments according to the invention were described above. The invention is not limited to the embodiments described. The inventive idea can be applied in numerous ways within the scope defined by the claims attached hereto.

The invention claimed is:

1. A method for exchange of information between a computing unit of a first entity and a computing unit of at least one second entity, the method comprising:
joining a service comprising a network and network elements by the computing unit of the first entity;
creating a token associated with the computing unit of the first entity, wherein the token comprises random data, and wherein the token is retrieved by an application residing in the computing unit of the first entity and a network element residing;
detecting of the at least one second entity by the computing unit of the first entity;
requesting information on a token comprising random data and associated with the at least one second entity from the computing unit of the at least one second entity;
receiving, by the computing unit of the first entity, information on the token from the computing unit of the at least one second entity;
retrieving, by the computing unit of the first entity, a token associated with the at least one second entity;
modifying the token associated with the first entity at least partly with the random data contained in the received token associated with the at least one second entity, wherein the retrieval and the modification are based on the behavior of a user of the service the computing unit of the first entity belongs to;
determining at least one measure of similarity between the modified token associated with the first entity and the received token associated with the at least one second entity;
selecting information to output in the computing unit of the first entity in response to the measure similarity, and
making a recommendation based on the selected information to the user of the service the computing unit of the first entity belongs to.

2. The method according to claim 1, the method further comprising: storing at least the modification of the token associated with the first entity.

3. The method according to claim 2, the storing comprising at least one of the following: replacement of the modified values of the token, replacement of the token with the modified token, creation of a new token, creation of a new token to an existing token structure.

4. The method according to claim 1, the method further comprising: modifying the token associated with the at least one second entity at least partly with the random data of the token associated with the first entity.

5. The method according to claim 1, wherein a correlation is determined as a measure of similarity.

6. The method according to claim 1, the step of determining at least one measure of similarity comprising a further step of selecting one measure of similarity among multiple determined measures of similarity.

7. The method according to claim 1, the method further comprising: retrieving the token associated with the first entity from a data storage.

8. The method according to claim 7, wherein the retrieval of the token is initiated in response to at least one of the following: the computing unit of the first entity accessing the service, the computing unit of the first entity detecting the at least one second entity belonging to the service, initiation of communication between the computing unit of the first entity and the computing unit of the at least one second entity.

9. The method according to claim 1, wherein the modification of the token associated with the at least one second entity comprises adding a reference, either directly or through a further entity, to the token associated with the first entity.

10. The method according to claim 9, wherein the reference is a network address.

11. A system, comprising:
a computing unit of a first entity;
a computing unit of at least one second entity;
the first and second computing units are configured to exchange of information; and
the computing unit of the first entity is configured to detect events within a service the computing unit of the first entity belongs to,
wherein the computing unit of the at least one second entity is configured to detect,
random data on a token associated with the at least one second entity from the computing unit of the at least one second entity is configured to request,
random data on the token from the computing unit of the at least one second entity is configured to receive,
the token associated with the at least one second entity is configured to retrieve on the basis of the received random data, a token associated with the first entity is configured to modify at least partly with random data of the received token associated with the at least one second entity, wherein the modification makes the tokens more similar,
at least one measure of similarity between the modified token associated to the first entity and the received token associated to the at least one second entity is configured to determine,
on the basis of the measure of similarity information to be output in the computing unit of the first entity is configured to output, and
a recommendation based on the outputted information.

12. A first computing device of at least one first entity that exchanges information with at least one second computing device of at least one second entity, the computing first device comprising:
a processing device;
a communication interface for exchanging information with at least one other computing unit; and
a memory device that stores computer code containing instructions executable by the processing device,
the computer code configured such that, upon execution by the processing device, the computer code causes the first computing device to:
detect the second computing device of the at least one second entity,
request random data on a token associated with the at least one second entity from the second computing device of the at least one second entity,
receive random data on the token from the second computing device of the at least one second entity,
retrieve, on the basis of the received random data, the token associated with the at least one second entity,
modify a token associated with the first entity at least partly with the random data of the received token associated with the at least one second entity, wherein the modification makes the tokens more similar,
determine at least one measure of similarity between the modified token associated with the first entity and the received token associated with the at least one second entity,
select and output information on the basis of the measure of similarity information, and
make a recommendation based on the outputted information.

13. A method for exchange of information between a computing unit of a first entity and a computing unit of at least one second entity, the method comprising:
the computing unit of the first entity joining a service comprising a network and network elements;
creating a token associated with the computing unit of the first entity and the first entity, wherein the token comprises random data, and wherein the token can be called and retrieved by an application residing in the computing unit of the first entity and/or by a network element residing in the network;
the computing unit of the first entity detecting the computing unit of the at least one second entity;
the computing unit of the first entity requesting random data on a token associated with the at least one second entity from the computing unit of the at least one second entity;
the computing unit of the first entity receiving random data on the token from the computing unit of the at least one second entity;
the computing unit of the first entity retrieving, on the basis of the received random data, the token associated to the at least one second entity;
modifying a token associated with the first entity at least partly with random data of the received token associated with the at least one second entity, wherein the modification makes the tokens more similar,
wherein the retrieval and modification is based on the behavior of a user of the service the computing unit of the first entity belongs to;
determining at least one measure of similarity between the modified token associated with the first entity and the received token associated with the at least one second entity; and
making a recommendation based on the measure of similarity to the user of the service the computing unit of the first entity belongs to.

* * * * *